US008825010B2

(12) United States Patent
Wang et al.

(10) Patent No.: US 8,825,010 B2
(45) Date of Patent: Sep. 2, 2014

(54) CELL LOCKING METHOD FOR MOBILE TERMINAL AND MOBILE TERMINAL CAPABLE OF LOCKING CELL

(75) Inventors: Yanping Wang, Shenzhen (CN); Yanqiang Zuo, Shenzhen (CN); Hu Feng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 256 days.

(21) Appl. No.: 13/501,299

(22) PCT Filed: Aug. 25, 2010

(86) PCT No.: PCT/CN2010/076327
§ 371 (c)(1),
(2), (4) Date: Apr. 11, 2012

(87) PCT Pub. No.: WO2011/047577
PCT Pub. Date: Apr. 28, 2011

(65) Prior Publication Data
US 2012/0202463 A1   Aug. 9, 2012

(30) Foreign Application Priority Data
Oct. 23, 2009   (CN) .......................... 2009 1 0180994

(51) Int. Cl.
*H04W 28/18*   (2009.01)
*H04W 48/20*   (2009.01)
(52) U.S. Cl.
CPC .................................. *H04W 48/20* (2013.01)
USPC ........................................... 455/411; 455/80

(58) Field of Classification Search
CPC ... H04W 64/00; H04W 84/045; H04W 36/18; H04W 76/02; H04W 28/0268; H04W 28/18; H04W 36/0083
See application file for complete search history.

(56) References Cited

U.S. PATENT DOCUMENTS 8,054,803 B2 * 11/2011 Kim .............................. 370/331
2004/0048597 A1 * 3/2004 Khushu et al. ............. 455/404.2
(Continued)

FOREIGN PATENT DOCUMENTS

| CN | 101072439 A | 11/2007 |
| CN | 100428820 C | 10/2008 |
| CN | 101668285 A | 3/2010 |

OTHER PUBLICATIONS

International Search Report for PCT/CN2010/076327 dated Nov. 20, 2010.

*Primary Examiner* — Rafael Pérez-Gutiérrez
*Assistant Examiner* — Frank Donado
(74) *Attorney, Agent, or Firm* — Ling Wu; Stephen Yang; Ling and Yang Intellectual Property (57) ABSTRACT

A cell locking method for a mobile terminal and a mobile terminal capable of locking a cell are disclosed in the present invention. The method includes: the mobile terminal acquiring a system identification (SID), a network identification (NID), a base station identifier (BASE ID) and a pseudorandom number (PN) of a current cell; judging whether the SID, NID, BASE ID and PN are already stored in a database of the mobile terminal, if yes, then setting the mobile terminal to a normal status; judging whether the SID, the NID, and the PN are already stored in the database of the mobile terminal and the database is not full, or whether the BASE ID and PN are already stored in the database of the mobile terminal, if yes, then transferring to D; and D. writing the SID, NID, BASE ID and PN into the database of the mobile terminal.

14 Claims, 5 Drawing Sheets

(56) References Cited

U.S. PATENT DOCUMENTS

| | | | |
|---|---|---|---|
| 2006/0217130 A1* | 9/2006 | Rowitch et al. | 455/456.1 |
| 2008/0287140 A1* | 11/2008 | Lee et al. | 455/456.2 |
| 2009/0098873 A1* | 4/2009 | Gogic | 455/436 |
| 2009/0129327 A1* | 5/2009 | Horn et al. | 370/329 |
| 2009/0135731 A1* | 5/2009 | Secades et al. | 370/252 |
| 2010/0002611 A1* | 1/2010 | Umatt et al. | 370/311 |
| 2010/0279705 A1* | 11/2010 | Rowitch et al. | 455/456.1 |

* cited by examiner

CELL LOCKING METHOD FOR MOBILE TERMINAL AND MOBILE TERMINAL CAPABLE OF LOCKING CELL

TECHNICAL FIELD

The present invention relates to the technical field of wireless communication, and in particularly, to a cell locking method for a mobile terminal and a mobile terminal capable of locking a cell.

BACKGROUND OF THE RELATED ART

With the rapid development of the mobile communication technology, the mobile terminal also exhibits diversified development, and the requirement on limiting the mobility of the mobile terminal also appears, i.e. limit the mobile terminal to only work in a specified cell. Currently, there are two common cell locking methods for the mobile terminal.

The first method is to lock the base station ID and system ID. In this method, the number of base stations which can be locked by the mobile terminal is firstly determined, each time the mobile terminal searches out a new base station, then the mobile terminal adds the base station to a base station list, and if the number of the base stations in the base station list reaches a specified number, then the mobile station stops updating the base station list; after having been registered into the base station, the terminal firstly compares to determine whether ID of this base station is already in the base station list, if it is contained in the base station list, then the terminal provides normal service, otherwise the terminal provides limited service.

The second method is to establish duplex channels between the system side and the mobile terminal, in which the system side issues a control command to the mobile terminal so as to configure the subscription list of the terminal, and the mobile terminal continuously monitors the system, reports information according to the requirements, and determines whether or not to provide normal service.

However, during implementation of the present invention, the inventors have found out that the above currently available cell locking methods for a mobile terminal has the following defects: first, the base station has respiratory effect, which means that, in the Code Division Multiple Access (CDMA) system, when the interference signal in a cell is very strong, the actual effective coverage area of the base station will be reduced; and when the interference signal in a cell is very weak, the actual effective coverage area of the base station will be increased. In a word, the respiratory effect exhibits that the coverage radius constricts as the number of users increases. The main reason leading to the respiratory effect is that the CDMA system is a self-interference system, where the increasing of user leads to the increasing of interference and affects the coverage. Due to the existence of respiratory effect, after the signal coverage of the base station becomes larger, the terminal located at the coverage boundary of the base station will be in the subscribed cell, but when the signal coverage of the base station becomes smaller, the terminal will be out of the coverage of the subscribed cell, then the terminal will be in a lock status, thus the service provided by the terminal is limited, and such phenomenon is called ping-pong effect. Secondly, in the abovementioned methods in the related art, although a plurality of base stations can be locked, there is no association among the locked base stations, and it is only judged whether the base station currently providing the service is in the subscribed base station list, if the current base station is not in the subscribed base station list and the number (preset in the terminal in advance) of the subscribed base stations does not reach the specified upper limit, then the base station currently providing the service is added into the subscription list and provides normal service, or the base station currently providing the service is in the subscribed base station list, then normal service will be provided; and if the current base station is not in the subscription list and the subscription list is full, then the terminal only provides limited service. Because there is no restriction relationship among the locked base stations, it leads to that these base stations may form individual islands, which conflicts with the object of locking a cell.

SUMMARY OF THE INVENTION

The problem to be solved by the present invention is to provide a cell locking method for a mobile terminal and a mobile terminal capable of locking a cell so as to overcome the defects of the ping-pong effect and island effect in related art.

In order to reach the abovementioned object, the technical solution of the present invention provides a cell locking method for a mobile terminal, and said method includes the steps of: step A. the mobile terminal searching a cell at a current location to acquire a system identification (SID), a network identification (NID), a base station identifier (BASE ID) and a pseudo-random number (PN) of the cell; step B. judging whether said SID, said NID, said BASE ID and said PN are already stored in a database of said mobile terminal, if yes, then setting the mobile terminal to a normal status and transferring to step E, otherwise transferring to step C; step C. judging whether said SID, said NID, and said PN are already stored in the database station of said mobile terminal and said database is not full, or said BASE ID and said PN are already stored in the database of said mobile terminal, if yes, then transferring to step D, otherwise setting said mobile terminal to a lock status and transferring to step E; step D. writing said SID, said NID, said BASE ID and said PN into the database of said mobile terminal and setting said mobile terminal into a normal status and transferring to step E; and step E. finishing the lock procedure.

Furthermore, before step A, the method further includes an initialization procedure, and said initialization procedure includes: setting the number N of limited dials; limiting the maximum number of BASE ID simultaneously supported by a user terminal; said user terminal, after a user acquiring the user terminal dials a (N+1)th non-emergent number, acquiring and storing said SID, said NID, said BASE ID and said PN in a system parameter message and a PN sequence set stored in said user terminal according to a current network signaling.

Furthermore, said PN sequence set includes an active set, a candidate set and a neighbor set.

Furthermore, after the mobile terminal is set into the lock status, the method further includes an unlock procedure F, and said F includes: step F1. an operator determining whether identity and requirement of said user is legal according to a cell unlock request of the user, if yes, then transferring to step F2, otherwise ending; step F2. the operator sending an unlock instruction or unlock short message to the user terminal; step F3. after receiving said unlock instruction or said unlock short message, the user terminal emptying the SID, NID, BASE ID and PN stored in said database and resetting locked cell configuration.

Furthermore, when the cell unlock request of said user is sent to the operator by dialing a specified service number, the operator sends said unlock short message to the user terminal.

Furthermore, when the cell unlock request of said user is sent to the operator by sending said user terminal to the operator, the operator sends said unlock instruction to the user terminal by using a tool.

Furthermore, when setting the mobile terminal to the lock status, the method further comprises: if said user terminal responds or initiates a service connection, then forbidding said user terminal to access or to respond to the system and sending back a specified error code to the system.

The technical solution of the present invention also provides a mobile terminal capable of locking a cell, and said mobile terminal includes a current cell parameter acquisition unit, a data storage unit, a parameter comparison unit, a database writing-in unit and a status setting unit; wherein the current cell parameter acquisition unit is used for acquiring a system identification (SID), a network identification (NID), a base station identifier (BASE ID) and a pseudo-random number (PN) of a current cell; the parameter comparison unit is used for comparing the parameter acquired by the parameter acquiring unit of said current cell with a parameter stored in said data storage unit; the database writing-in unit is used for writing data into said database according to the comparison result of said parameter comparison unit; and the status setting unit is used for setting the status of said mobile terminal according to the comparison result of said parameter comparison unit.

Furthermore, said database writing unit is further used for writing said SID, said NID, said BASE ID and said PN into the database of said mobile terminal when said comparison result is that said SID, said NID and said PN acquired by the current cell parameter acquisition unit are the same as the SID, NID and PN stored in said database and said database is not full, or when said BASE ID and said PN acquired by the current cell parameter acquisition unit are the same as the BASE ID and PN stored in said database.

Furthermore, said status setting unit is further used for setting said mobile terminal into the normal status when said comparison result is that said SID, said NID, said BASE ID and said PN acquired by the current cell parameter acquisition unit are the same as the SID, NID, BASE ID and PN stored in said database, or when said SID, said NID and said PN acquired by the current cell parameter acquisition unit are the same as the SID, NID and PN stored in said database and said database is not full, or when said BASE ID and said PN acquired by the current cell parameter acquisition unit are the same as the BASE ID and PN stored in said database, otherwise setting said mobile terminal into the lock status.

Furthermore, said mobile terminal further includes an unlock unit which is connected to said data storage unit and is used for emptying the SID, NID, BASE ID and PN in said database according to a received unlock instruction or unlock short message and reset locked cell configuration The beneficial effects of the present invention compared with related art are as follows:

by the present invention, the operating costs is reduced without adding or modifying the configuration of the network side; in addition, by the present invention, a certain cell can be strictly locked, which solves the ping-pong effect generated by spasmodically locking a certain cell at some special locations by the terminal due to the network respiratory effect, and also will not lead to island effect.

PREFERRED EMBODIMENTS OF THE PRESENT INVENTION

Hereinafter, the particular embodiments of the present invention will be further described in detail in conjunction with the accompanying drawings and examples. The following examples are used for describing the present invention, but not for limiting the scope of the present invention.

In the examples of the present invention, the cells in a CDMA network are defined as a set P of several {SID, NID, BASE ID, PN}, and it can be known from the network characteristics that all the SIDs and NIDs are the same in the same cell, a set B of the BASE ID is the base station registered by the current terminal and the neighbor base station, and the BASE ID of the current base station can be acquired from a system parameter message sent by the base station; and the PN set of the cell where the terminal is located is S. Such a cell structure is for adapting to the respiratory effect of the CDMA network, and avoiding the ping-pong effect caused by the respiratory effect, and at the same time it also can avoid the island effect caused by only locking the BASE ID in the conventional cell locking solution. In this case, said SID is the abbreviation of system identification which indicates the System ID; said NID is the abbreviation of network identification which indicates the network ID; said BASE ID indicates the base station ID; and said PN is the abbreviation of pseudo-random number which indicates pseudo-random code.

Example 1

Figure 1:
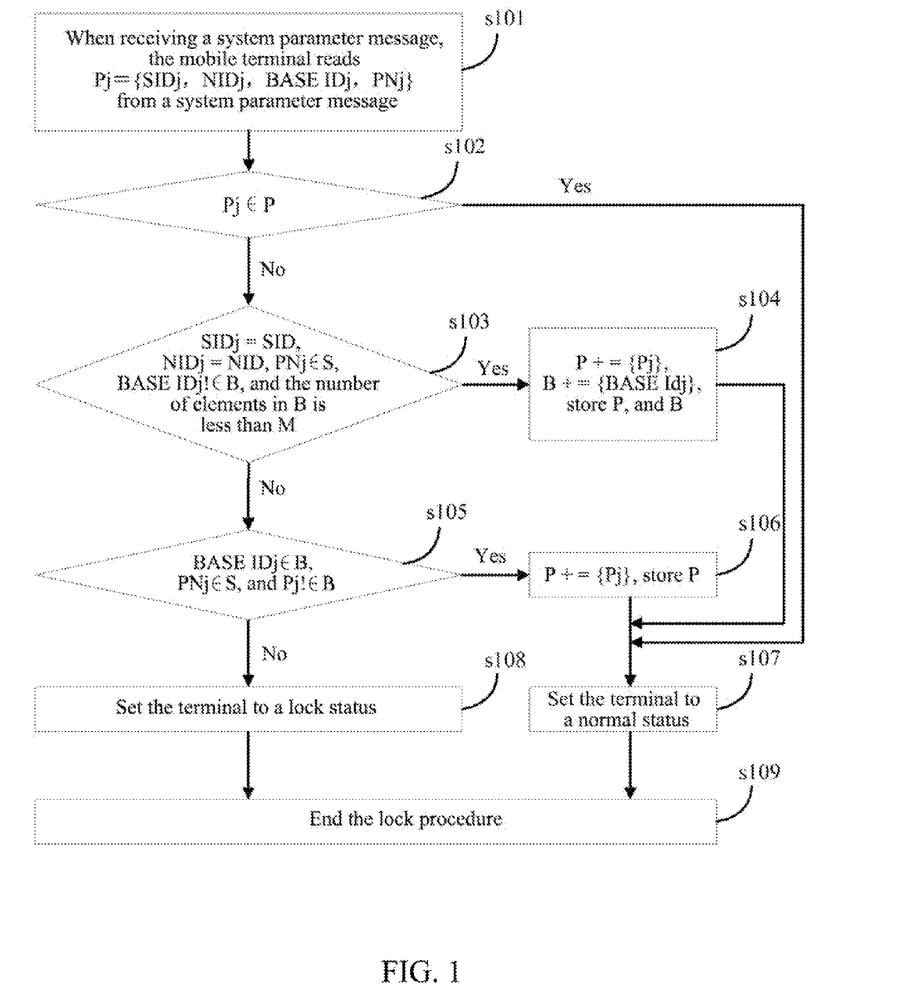
FIG. 1 is a flowchart of a cell locking method for a mobile terminal in an example of the present invention.

A cell locking method for a mobile terminal in the example of the present invention is as shown in FIG. 1 and includes the steps as follows.

Step s101. The mobile terminal searches a cell at a current location, and the mobile terminal, when receiving a system parameter message, reads Pj={SIDj, NIDj, BASE IDj, PNj} from the system parameter message.

Step s102. It is judged whether Pj belongs to P; if yes, then transfer to step s107, otherwise transfer to step s103.

Step s103. It is judged whether SIDj=SID, NIDj=NID, PNj∈S, BASE IDj!∈B, and the number of elements in B is less than the maximum number M of the BASE ID simultaneously supported by the user terminal, if yes, then transfer to step s104, otherwise transfer to step s105.

Step s104. Pj is added to the set P, i.e. P+={Pj}; BASE IDj is added to set B, i.e. B+={BASE IDj}; B and P are stored, and transfer to step s107.

Step s105. It is judged whether BASE IDj∈B, PNj∈S, and Pj!∈P, if yes, then transfer to step s106, otherwise transfer to step s108.

Step s106. Pj is added to set P, i.e. P+={Pj}, then P is stored and transfer to step s107.

Step s107. The mobile terminal is set to a normal status and transfer to step s109.

Step s108. The mobile terminal is set to a lock status and transfer to step s109.

Step s109. The lock procedure is ended.

Example 2

Figure 2:
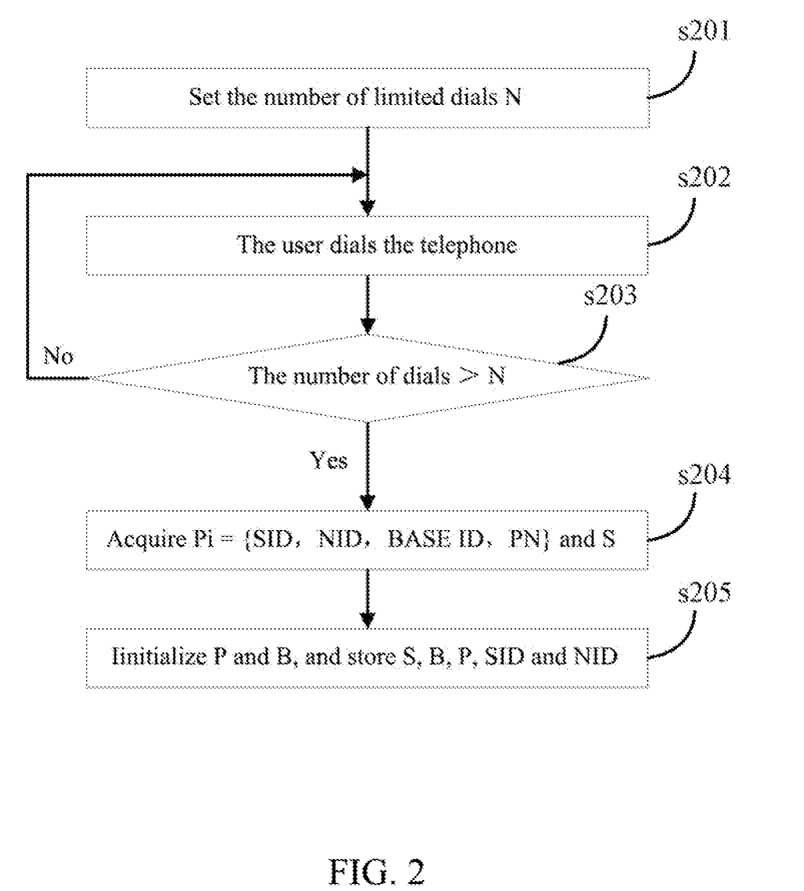
FIG. 2 is a flowchart of an initialization procedure in an example of the present invention.

Before example 1, the present invention further includes an initialization procedure, and the flow of the initialization procedure in the example of the present invention is as shown in FIG. 2 and includes the following steps.

Step s201, the number of limited dials N which is 5 in this example is set.

Step s202, the user, after having acquired the user terminal, dials the telephone.

Step s203, it is judged whether the number of times of non-emergent number dialed by the user is greater than N; if yes, then transfer to step s204, otherwise transfer to step s202.

Step s204, the user terminal acquires Pi={SID, NID, BASE ID, PN} in the system parameter message sent by the current base station and the PN set S maintained by the terminal, wherein the PN sequence set S includes an active set, a candidate set and a neighbor set.

Step s205, the user terminal initializes the set P={Pi}, B={BASE ID}, and automatically stores S, P, B, SID and NID.

Example 3

Figure 3:
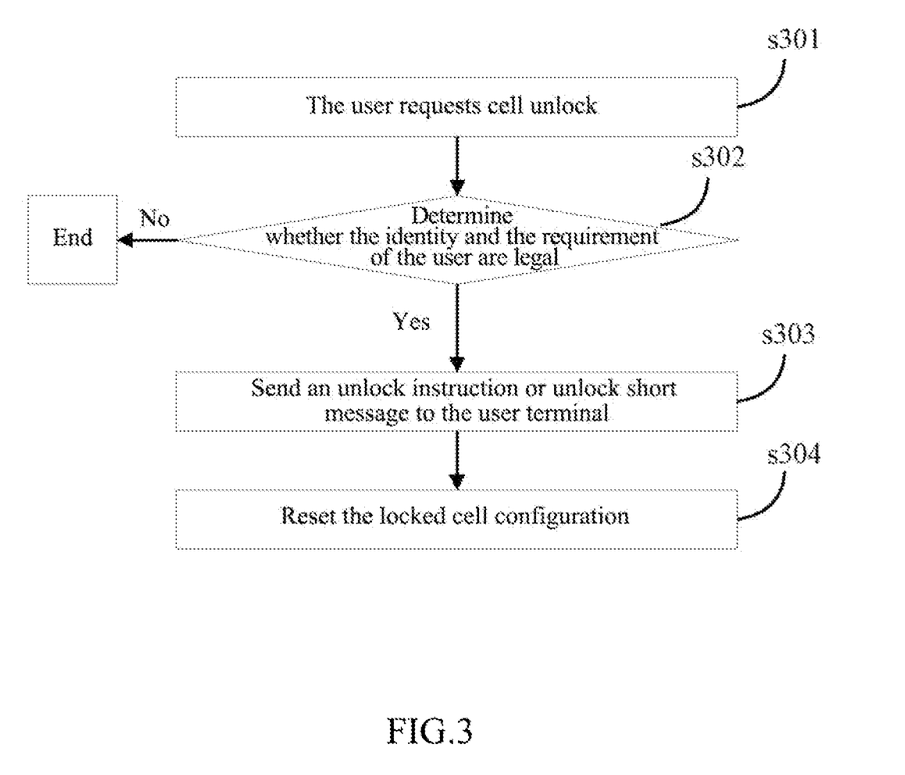
FIG. 3 is a flowchart of unlock of an example of the present invention.

When the mobile terminal is in the lock status, the user can alter the subscribed cell by way of an unlock procedure, and an unlock procedure in the example of the present invention is as shown in FIG. 3, which includes the steps as follows.

Step s301, the user requests a cell unlock.

Herein, the user can request cell unlock toward the operator by two manners, among which one manner is to send the request to the operator by dialing a specified service number, another manner is to send the user terminal to the operator.

Step s302, the operator determines whether the identity and the requirement of the user is legal according to the cell unlock request of the user, if yes, then transfer to step s303, otherwise end.

Step s303, when the cell unlock request of the user is sent to the operator by dialing a specified service number, the operator sends an unlock short message to the user terminal; and when the cell unlock request of the user is sent to the operator by sending the user terminal thereto, the operator sends an unlock instruction to the user terminal by using a tool.

Step s304, after having received the unlock instruction or unlock short message, the user terminal empties the SID, NID, BASE ID and PN in the database and resets the locked cell configuration.

After having reset the locked cell configuration, the user terminal restarts the cell locking procedure.

Figure 4:
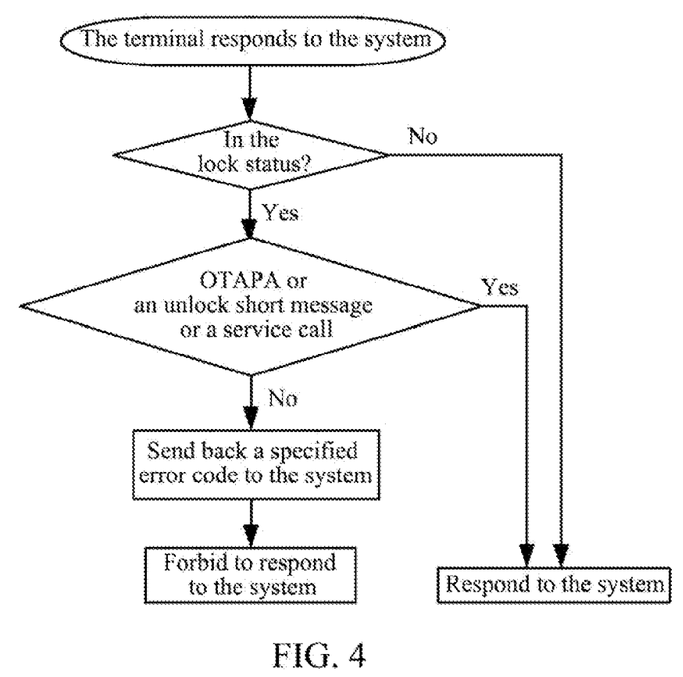
FIG. 4 is a flowchart of a mobile terminal responding to a system after locking a cell using the present invention.
Figure 5:
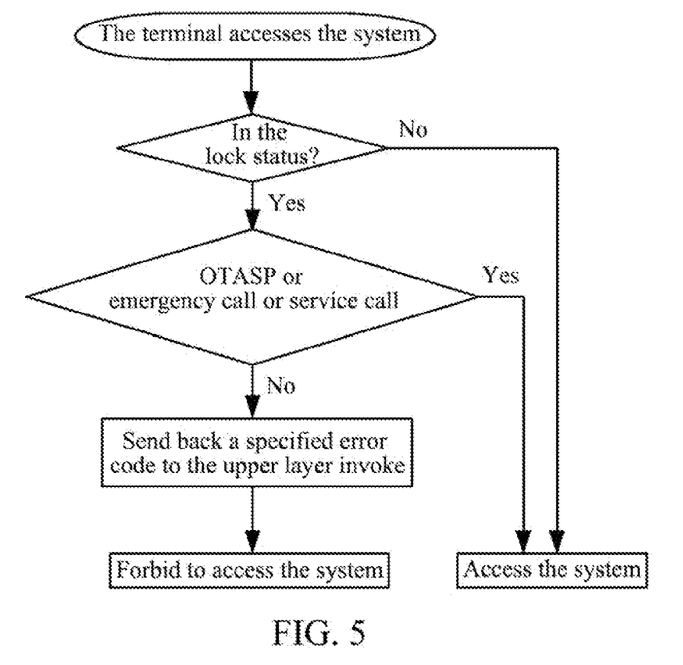
FIG. 5 is a flowchart of a mobile terminal accessing a system after locking a cell using the present invention.

Herein, after the mobile terminal locks a cell using the present invention, its procedure of responding to the system is as shown in FIG. 4, and its procedure of accessing the system is as shown in FIG. 5. When the mobile terminal responds or initiates a service connection, the status of the current mobile terminal will be first checked. If the mobile terminal is in the normal status, then the terminal normally accesses or responds to the system. If the mobile terminal is in the lock status, then it is checked whether the user alters the subscribed cell by way of unlock procedures such as an Over The Air Parameter Administration (OTAPA), an unlock short message or dialing a specified number, etc., if yes, then unlock is performed and the normally access or responding to the system is performed, otherwise, a specified error code is sent back to the system and the access or respond to the system is forbidden.

Figure 6:
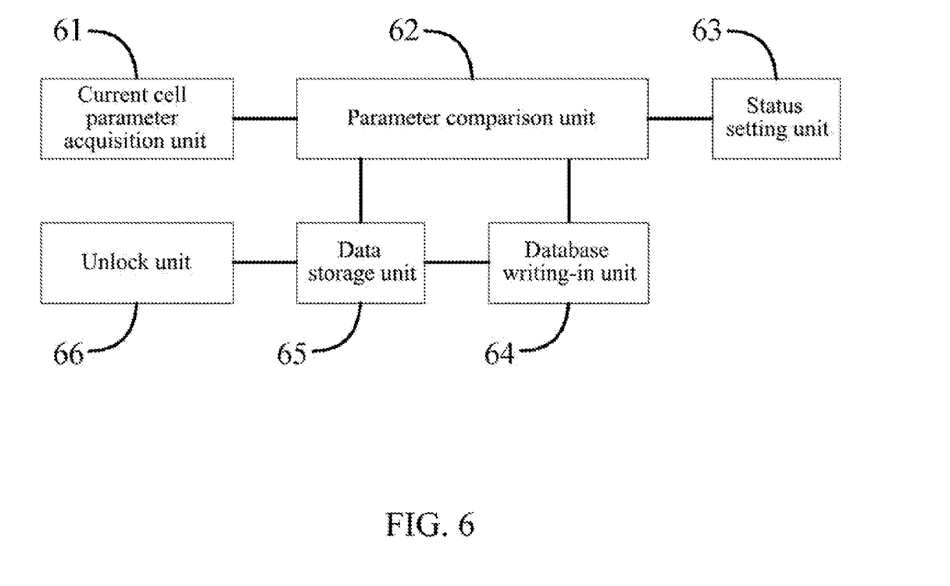
FIG. 6 is a schematic diagram of a mobile terminal capable of locking a cell in an example of the present invention.

The schematic diagram of a mobile terminal capable of locking a cell in the example of the present invention is as shown in FIG. 6, in which the mobile terminal includes a current cell parameter acquisition unit 61, a parameter comparison unit 62, a status setting unit 63, a database writing-in unit 64, a data storage unit 65 and an unlock unit 66. Among them, the parameter comparison unit 62 is respectively connected to the current parameter acquisition unit 61, status setting unit 63, database writing-in unit 64 and data storage unit 65; and the data storage unit 65 is respectively connected to the database writing-in unit 64 and unlock unit 66.

The current cell parameter acquisition unit 61 is used for acquiring the SID, NID, BASE ID and PN of the current cell.

The data storage unit 65 is used for storing the database of the mobile terminal, wherein, the database includes the SID, NID, BASE ID and PN parameters in the database.

The parameter comparison unit 62 is used for comparing the parameter acquired by parameter acquiring unit 61 of the current cell with the parameter stored in data storage unit 65.

The database station writing-in unit 64 is used for writing data into the database according to the comparison result of the parameter comparison unit 62; writing the SID, NID, BASE ID and PN into the database of the mobile terminal when the comparison result is that the SID, NID and PN acquired by parameter acquiring unit 61 of the current cell are the same as the SID, NID and PN stored in the database and the database is not full, or when the BASE ID and PN acquired by parameter acquiring unit 61 of the current cell are the same as the SID, the BASE ID and PN stored in the database.

The status setting unit 63 is used for setting the status of the mobile terminal according to the comparison result of parameter comparison unit 62; setting the mobile terminal into a normal status when the comparison result is that the SID, NID, BASE ID and PN acquired by parameter acquiring unit 61 of the current cell are the same as the SID, NID, BASE ID and PN stored in the database, or when the SID, NID and PN acquired by parameter acquiring unit 61 of the current cell are the same as the SID, NID and PN stored in the database and the database is not full, or when the BASE ID and PN acquired by parameter acquiring unit 61 of the current cell are the same as the SID, NID and PN stored in PN database, otherwise, setting the mobile terminal to a lock status.

The unlock unit 66 is used for emptying the SID, NID, BASE ID and PN in the database and resetting the locked cell configuration according to the received unlock instruction or unlock short message.

When using the present invention, the operating costs can be reduced without adding or modifying the configuration of the network side; and the present invention can strictly lock a certain cell, which solves the ping-pong effect generated by spasmodically locking a certain cell at some special location by the terminal due to the network respiratory effect, and also will not lead to island effect.

What is described above is merely preferred embodiments of the present invention, and it should be pointed out that several improvements and modifications can also be made without departing from the technical principle of the present invention for those skilled in the art, and these improvements and modifications should also be regarded as the scope of protection of the present invention.

What we claim is:

1. A cell locking method for a mobile terminal, wherein said method comprises:

searching, by the mobile terminal, a current cell at a current location to acquire a system identification (SID), a network identification (NID), a base station identifier (BASE ID) and a pseudo-random number (PN) of said cell;

judging, by the mobile terminal, whether said SID, said NID, said BASE ID and said PN of the current cell are already stored in a database of said mobile terminal;

when said SID, said NID, said BASE ID and said PN of the current cell are all already stored in the database of said mobile terminal, setting said mobile terminal to a normal status for normal operation;

when said SID, said NID and said PN are already stored in the database of said mobile terminal, but said BASE ID is not stored in the database and said database is not full, writing said BASE ID, with said SID, said NID and said PN, into the database, and setting said mobile terminal into the normal status for normal operation;

when said BASE ID and said PN are already stored in the database of said mobile terminal, but said SID and said NID are not stored in the database, writing said SID and said NID, with said BASE ID and said PN, into the database, and setting said mobile terminal into the normal status for normal operation;

for any other judgment results, setting said mobile terminal to a lock status for not normal operation.

2. The cell locking method for a mobile terminal according to claim 1, wherein before the step of searching, by the mobile terminal, a current cell at a current location, the method further comprises an initialization procedure, and said initialization procedure comprises:

setting a number N of limited dials;

limiting a maximum number of BASE IDs simultaneously supported by the mobile terminal of a user;

after the user acquiring the mobile terminal dials a (N+1)th non-emergent number, acquiring and storing, by the mobile terminal, said SID, said NID, said BASE ID and said PN in a system parameter message and a PN sequence set stored in said mobile terminal according to a current network signaling.

3. The cell locking method for a mobile terminal according to claim 2, wherein when setting the mobile terminal to the lock status, the method further comprises: if said mobile terminal responds or initiates a service connection, then forbidding said mobile terminal to access or to respond to the system and sending back a specified error code to the system.

4. The cell locking method for a mobile terminal according to claim 2, wherein said PN sequence set comprises an active set, a candidate set and a neighbor set.

5. The cell locking method for a mobile terminal according to claim 4, wherein when setting the mobile terminal to the lock status, the method further comprises: if said mobile terminal responds or initiates a service connection, then forbidding said mobile terminal to access or to respond to the system and sending back a specified error code to the system.

6. The cell locking method for a mobile terminal according to claim 1, wherein after the mobile terminal is set to the lock status, the method further comprises an unlock procedure, and said unlock procedure comprises:

determining, by an operator, whether identity and requirement of said user is legal according to a cell unlock request of the user;

when the identity and requirement of said user is legal, sending, by the operator, an unlock instruction or unlock short message to the user terminal;

after receiving said unlock instruction or said unlock short message, emptying, by the mobile terminal, the SID, NID, BASE ID and PN stored in said database and resetting locked cell configuration.

7. The cell locking method for a mobile terminal according to claim 6, wherein when setting the mobile terminal to the lock status, the method further comprises: if said mobile terminal responds or initiates a service connection, then forbidding said mobile terminal to access or to respond to the system and sending back a specified error code to the system.

8. The cell locking method for a mobile terminal according to claim 6, wherein when the cell unlock request of said user is sent to the operator by dialing a specified service number, the operator sends said unlock short message to the user terminal.

9. The cell locking method for a mobile terminal according to claim 8, wherein when setting the mobile terminal to the lock status, the method further comprises: if said mobile terminal responds or initiates a service connection, then forbidding said mobile terminal to access or to respond to the system and sending back a specified error code to the system.

10. The cell locking method for a mobile terminal according to claim 6, wherein when the cell unlock request of said user is sent to the operator by sending said user terminal to the operator, the operator sends said unlock instruction to the user terminal by using a tool.

11. The cell locking method for a mobile terminal according to claim 10, wherein when setting the mobile terminal to the lock status, the method further comprises: if said mobile terminal responds or initiates a service connection, then forbidding said mobile terminal to access or to respond to the system and sending back a specified error code to the system.

12. The cell locking method for a mobile terminal according to claim 1, wherein when setting the mobile terminal to the lock status, the method further comprises: if said mobile terminal responds or initiates a service connection, then forbidding said mobile terminal to access or to respond to the system and sending back a specified error code to the system.

13. A mobile terminal capable of locking a cell, wherein said mobile terminal comprises a current cell parameter acquisition unit, a data storage unit, a parameter comparison unit, a database writing-in unit and a status setting unit, wherein the current cell parameter acquisition unit is used for acquiring a system identification (SID), a network identification (NID), a base station identifier (BASE ID) and a pseudo-random number (PN) of a current cell;

the data storage unit is used for storing a database of the mobile terminal, wherein, the database includes SID, NID, BASE ID and PN parameters;

the parameter comparison unit is used for comparing the SID, NID, BASE ID and PN acquired by the current cell parameter acquisition unit with the parameters stored in said data storage unit by the following ways:

when said SID, said NID, said BASE ID and said PN of the current cell are all already stored in the database of said mobile terminal, sending a first comparison result to the status setting unit, when said SID, said NID and said PN are already stored in the database of said mobile terminal, but said BASE ID is not stored in the database and said database is not full, sending a second comparison result to the database writing-in unit and the status setting unit, when said BASE ID and said PN are already stored in the database of said mobile terminal, but said SID and said NID are not stored in the database, sending a third comparison result to the database writing-in unit and the status setting unit, and when the comparison result does not meet any one of the above comparison results, sending a fourth comparison result to the status setting unit;

the database writing-in unit is used for: when receiving the second comparison result, writing said BASE ID, with said SID, said NID and said PN, into said database; when receiving the third comparison result, writing said SID and said NID, with said BASE ID and said PN, into the database;

the status setting unit is used for: when receiving the first comparison result, the second comparison result, or the third comparison result, setting said mobile terminal to a normal status for normal operation; when receiving the fourth comparison result, setting said mobile terminal to a lock status for not normal operation.

14. The mobile terminal according to claim 13, wherein said mobile terminal further comprises an unlock unit which is connected to said data storage unit and is used for emptying the SID, NID, BASE ID and PN in said database according to a received unlock instruction or unlock short message and resetting the locked cell configuration.

\* \* \* \* \*